United States Patent [19]
Butters et al.

[11] Patent Number: 5,462,674
[45] Date of Patent: Oct. 31, 1995

[54] METHOD AND SYSTEM FOR PHOTOCATALYTIC DECONTAMINATION

[75] Inventors: Brian E. Butters, St. Thomas; Anthony L. Powell, Ontario, both of Canada

[73] Assignee: Purific Environmental Technologies, Inc., Canada

[21] Appl. No.: 205,699

[22] Filed: Mar. 3, 1994

[51] Int. Cl.⁶ .................. C02F 1/48; C02F 1/32; B01D 63/06; B01D 65/02
[52] U.S. Cl. .............. 210/748; 210/763; 210/321.8; 210/321.69; 210/408; 210/791
[58] Field of Search ................ 210/763, 748, 210/321.8, 321.69, 408, 791

[56] References Cited

U.S. PATENT DOCUMENTS

| | | | |
|---|---|---|---|
| 4,446,236 | 5/1984 | Clyde | 435/287 |
| 4,615,799 | 10/1986 | Mortensen | 210/117 |
| 4,694,179 | 9/1987 | Lew et al. | 250/431 |
| 4,892,712 | 1/1990 | Robertson et al. | 422/186 |
| 5,118,422 | 6/1992 | Cooper et al. | 210/636 |
| 5,174,877 | 12/1992 | Cooper et al. | 204/193 |

OTHER PUBLICATIONS

User's Manual SCT Membranes—"MEMBROLOX®".

*Primary Examiner*—Neil McCarthy
*Attorney, Agent, or Firm*—John G. Flaim

[57] ABSTRACT

A method and system for purifying a contaminated fluid in a continuous manner is herein disclosed. The present invention provides for the irradiation of a slurry between a defined surface(s) such that substantially all of the contaminants are removed from the slurry, and a turbulent flow of the slurry is achieved. The present invention further provides for the separation of decontaminated effluent from the slurry by employing ceramic membrane filters. Air is applied to the ceramic membrane filters at relatively high pressures in order to remove any photoreactive catalyst particles that have collected in the ceramic membranes.

21 Claims, 8 Drawing Sheets

METHOD AND SYSTEM FOR PHOTOCATALYTIC DECONTAMINATION

FIELD OF THE INVENTION

The present invention relates generally to a method and system for the continuous and efficient photocatalytic decontamination of contaminated fluid.

BACKGROUND OF THE INVENTION

Slurries result from the mixture of a contaminated fluid with a photoreactive catalyst. Irradiation of a slurry, with light of sufficient energy, creates the formation of electrons and holes on the surface of the photoreactive catalyst. Electrochemical modifications to the contaminated fluid result from such formations. Such electrochemical modifications are generally referred to as a photocatalytic reaction. Photocatalytic reactions are employed for numerous purposes, such as decomposition, photosynthesis, the oxidation of contaminants, the reduction of contaminants, the sterilization of bacteria, deposition of metals, and the like. For example, a photocatalytic reaction can serve to oxidize toxic organics into carbon dioxide and water.

A catalytic action results when a catalyst reduces the "activation energy" that is required to complete a chemical reaction. In photocatalytic reactions, activation energy is provided by the photon energy of incident band-gap light. Incident band-gap light is provided by visible and ultraviolet light. When incident band-gap light is absorbed by a photoreactive catalyst, electron and hole charge carriers pairs are produced within the photocatalytic particles. These charge carriers then perform reduction/oxidation ("redox") reactions with the chemical species. Thus, optically excited photoreactive catalysts, such as anatase $TiO_2$, can drive a chemical reaction at substantially lower temperatures than would otherwise be required.

The prior art provides for the irradiation of large amounts of slurry at one time. By irradiating the slurry in such a manner, only photoreactive catalysts that are exposed to the light source—those particles which come into close proximity with the light source—are irradiated. Consequently, only some portions of a slurry can be subjected to a photocatalytic reaction at one time. For example, U.S. Pat. No. 5,174,877, issued to Cooper et al., discloses subjecting an entire slurry to a photocatalytic reaction at one time in a tank reactor. The slurry at the bottom of the tank reactor is continually shifted to the top of the tank reactor until all of the slurry is subjected to a photocatalytic reaction.

Moreover, the prior art has gone to great lengths to continually mix a slurry so that the catalyst is suspended and uniformly dispersed throughout the slurry. For example, U.S. Pat. No. 5,174,877, issued to Cooper, et al., provides for stirring impellers composed of various materials and geometries and disposed on the bottom of a reactor tank for maintaining catalytic particles in a suspended state within the slurry. This has proven to be a time consuming and inefficient undertaking.

Once a photocatalytic reaction has taken place, and contaminants destroyed from the contaminated fluid, it is necessary to segregate the photoreactive catalyst from the decontaminated effluent. The prior art that the applicant is aware of provides for filtration techniques through the utilization of a membrane composed of a polymeric materials, such as polypropylene, as disclosed in U.S. Pat. No. 5,118,422, issued to Cooper, et al.

Several serious problems are encountered when utilizing polymeric membranes in order to segregate photoreactive catalysts from a decontaminated effluent. Membranes composed of a polymeric material are unable to withstand elevated temperatures, as well as the application of elevated pressures. Inevitably, photoreactive catalysts collect in the membrane. Conventional methods have attempted to remove the build-up of photoreactive catalyst in the polymeric membranes by "back flushing" methods in order to minimize the forces that are exerted on a membrane. Due to the elastic nature of polymeric membranes, some catalysts even become embedded in the polymeric membranes.

Conventional back flushing methods require a significant volume of already recovered decontaminated effluent to be passed back through a polymeric membrane, over a substantial period of time, in order to remove photoreactive catalysts collections in the polymer. By requiring a substantial period of time to perform back flushing, the degree and volume of fluid that can be subjected to a photocatalytic reaction is significantly decreased. That is, a continuous flow process cannot be achieved. Further, polymeric membranes suffer from a high failure rate due to the wearing and stretching of the elastic polymer. Still further, polymeric membranes can be dissolved by various organics, and are unable to be sterilized without the use of chemicals. Moreover, polymeric membranes can be regularly used for only a few years, sometimes even months, before replacement is needed.

Even more troublesome is the effect of polymeric membranes on the system wherein they are employed. Conventional systems must include equipment, such as accumulators, buffer tanks, and centrifugal pumps, in order to allow for the back flushing of polymeric membranes. Mixing devices are also necessary to prevent stagnant catalytic particles from settling when back flushing operation are occurring.

Since back flushing requires a substantial expenditure of time, it is only undertaken on an infrequent basis. As a result, significant amounts of catalytic particles settle in the membranes. In turn, the time required for separating the catalyst from the decontaminated effluent is increased. Further, the concentrations of catalyst within a slurry significantly fluctuates.

In sum, conventional methods and systems do not provide for the efficient decontamination of fluids. Rather, conventional methods and systems are time consuming and inefficient. This results from an inability to subject catalysts, that are dispersed in a slurry, to irradiation in an efficient manner. Furthermore, conventional methods and systems are not able to continuously segregate decontaminated effluents from catalysts. This inability is magnified when high volumes of a slurry is provided for segregation, as is the case in large scale commercial applications.

It is thus highly desirable to provide for a method and system which overcomes the aforementioned problems of the prior art in order to enable the continuous, as well as efficient and effective, purification of contaminated fluids by a photocatalytic reaction.

SUMMARY OF THE INVENTION

Accordingly, it is an object of the present invention to provide for a substantially continuous and efficient method and system for purifying contaminated fluids.

In contrast to conventional methods and systems for purifying a contaminated fluid, the present invention utilizes a method and system that is able to purify significantly large volumes of contaminated fluid in a substantially continuous manner. Such is accomplished by the cooperation of various components and processes with one another.

According to the present invention, a treatment system is provided with one or more photocatalytic cells. Each photocatalytic cell includes a space that is defined by the surfaces of two plates. The distance between two surfaces that form an annulus is such that only a single layer of photoreactive catalyst is exposed to light that is emitted. Turbulent flow of a slurry between the surfaces of the annulus can therefore be achieved. As a result, rotational movement of catalytic particles and contaminated molecules is achieved.

According to the present invention, the slurry is applied to a filter unit. The filter unit is operable to separate the decontaminated fluid from the slurry. The filter unit, preferably composed of a ceramic material, is subjected to shock waves that result by applying a high pneumatic pressure to the filter unit in order to remove any collections of catalytic particles having collected in the ceramic membrane. Such shock waves, which last for less than one second, can be intermittently applied such that the continuity of the method and system is not affected. This is in stark contrast to conventional filter units, which employ polymeric membranes that ordinarily require between 45 and 90 seconds to back flush a filter unit.

Deriving from the filter unit is a slurry retentate that is primarily comprised of concentrated photoreactive catalysts. Preferably, only 10% to 20% of the slurry retentate is returned for mixture with further contaminated fluid. The remaining 80% to 90% of the slurry retentate is returned to the filter unit. This allows for high volumes of fluid to be passed through the filter unit such that the efficiency of the filter unit is significantly increased.

A feature of the present invention is that metals can be removed from the contaminated fluid without interrupting the continuous flow of the present invention. Chemicals that are employed to remove metals, such as acids and bases, can be added to the method and system of the present invention since ceramic membranes possess a resilience to such chemicals. Once metals are removed from the catalyst, they can be segregated from the slurry by a ceramic filter unit, along with the decontaminated fluid. Alternatively, the metals can be intermittently removed by a removal system before or after the slurry is passed through the filter unit.

The present invention thus provides for a continuous operation. The slurry and the slurry retentate are always in continuous movement. This precludes the settling of catalytic particles, and thus avoids the employment of mixing equipment which significantly adds to the complexity of a system.

Other and further objects, features and advantages will be apparent from the following detailed description of the preferred embodiment of the present invention, given for the purpose of disclosure, and taken in conjunction with the accompanying drawings.

BRIEF DESCRIPTION OF THE DRAWINGS

The foregoing and other objects, aspects and advantages of the present invention will be better understood from the following detailed description of the preferred embodiment of the invention with reference to the accompanying drawings, in which.

DETAILED DESCRIPTION OF THE PREFERRED EMBODIMENT OF THE PRESENT INVENTION

As used herein, "contaminated fluid" is a fluid that contains undesirable organic, inorganic products, metals, and possibly microbial cells or other microorganisms. Although contaminants are undesirable in the sense that they are usually toxic when ingested or contacted by humans, the term "undesirable" should not be understood to be restricted to such toxic substances. As used herein, the term "decontaminated effluent" means that the undesirable substances in the contaminated fluid have been altered or modified into a desirable or an acceptable substance, again, usually a substance that is non-toxic. Such alteration or modification can result from the oxidation of contaminants, reduction of contaminants, disinfection and/or sterilization of bacteria, or the like. Normally such alteration or modification of any organic substance is achieved by decomposing the substance into byproducts having a smaller molecular weight than the original contaminated fluid. It should be noted that "fluids" and "effluents" should not be read or interpreted as being limited to liquids. Rather, such also encompass gases, such as air.

The catalyst that is preferably employed with the method and system of the present invention is anatase $TiO_2$. Alternatively, other catalysts, such as $TiO_3$, $ZnO$, $CdS$, $CdSe$, $SnO_2$, $SrTiO_3$, $WO_3$, $Fe_2O_3$, and $Ta_2O_5$, can be employed. Preferably, the anatase $TiO_2$ is composed of particles having a surface area of 25 $m^2/g$ or greater. In a more preferred embodiment, the anatase $TiO_2$ is composed of particles having a surface area of 75 m²/g. By utilizing anatase $TiO_2$ particles of this size in the present invention, a higher throughput of decontaminated effluent is achieved, as explained further below.

System Implementation

Figure 1:
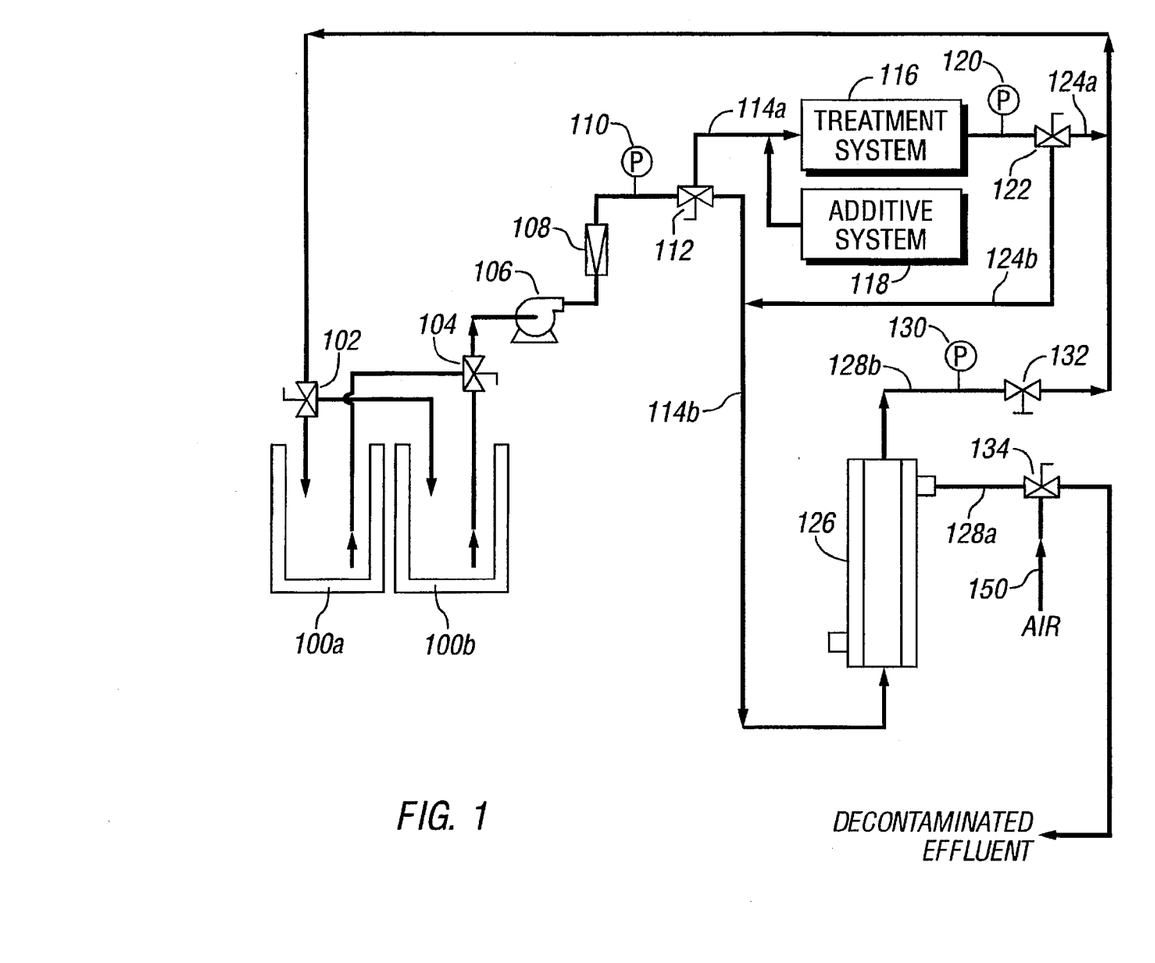
FIG. 1 is a process flow diagram of a continuous purification system, in accordance with a preferred embodiment of the present invention.

Referring to FIG. 1, a process flow diagram of a continuous purification system, in accordance with a preferred embodiment of the present invention, is illustrated. A slurry, which includes a photoreactive catalyst and a contaminated fluid is contained within reservoirs 100a and 100b. Reservoirs 100a and 100b are controlled by valves 102 and 104. Valve 102 controls the ingress of slurry into reservoirs 100a and 100b whereas valve 104 controls the egress of slurry from reservoirs 100a and 100b. Pump 106 is operable to draw the fluid from reservoirs 100a and 100b. The fluid drawn from pump 106 is passed through flow meter 108 as well as pressure gauge 110, and onto valve 112. Valve 112 can direct the slurry to follow the paths denoted by reference numerals 114a and 114b. When the slurry is directed to flow in accordance with path 114a, the slurry is directed to treatment system 116. Treatment system 116 is operable to subject the slurry to a photocatalytic reaction. As a consequence of the photocatalytic reaction, contaminants will be destroyed and removed from the slurry.

Chemical additives may be combined with the slurry before the slurry is subjected to a photocatalytic reaction by treatment system 116. Such an additive system is denoted by reference numeral 118. Chemical additives are preferably oxidants, such as air, oxygen, and hydrogen peroxide. Oxidants provide additional oxygen and balance the use of positive and negative charges.

Exiting treatment system 116 is a decontaminated effluent in combination with a photoreactive catalyst. Such combination is measured by pressure gauge 120 and directed to valve 122. Valve 122 can direct such mixture to flow in one of two paths, namely, the paths denoted by reference numerals 124a and 124b. When the mixture is directed along flow path 124a, it is recirculated to reservoirs 100a and 100b in order to undergo further decontamination by virtue of treatment system 116. When valve 122 directs the mixture along flow path 124b, the mixture is directed to filter unit 126. Filter unit 126 is operable to segregate the mixture into a slurry retentate and decontaminated effluent, where the slurry retentate contains higher concentrations of photoreactive catalyst and lesser amounts of fluid. Decontaminated effluent is passed through outlet 128a, and then through valve 134. The concentrated slurry retentate is passed through outlet 128b, through pressure gauge 130, and through valve 132 before it is recirculated to reservoirs 100a and 100b. Valve 134 is preferably disposed at outlet 128a to provide high pressured air towards filter unit 126 in order to displace any catalytic particles that have collected or been embedded in filter unit 126. Such high pressured air is delivered through conduit 150. This results with the imposition of a shock wave on filter unit 126.

Filter unit 126 may be employed in either a cross-flow mode of operation as illustrated in FIG. 1, or a dead end mode of operation. When employed in a dead end mode of operation, only segregated decontaminated effluent is emitted from filter unit 126. Thus, no slurry retentate is returned via flow path 128b.

Figure 2:
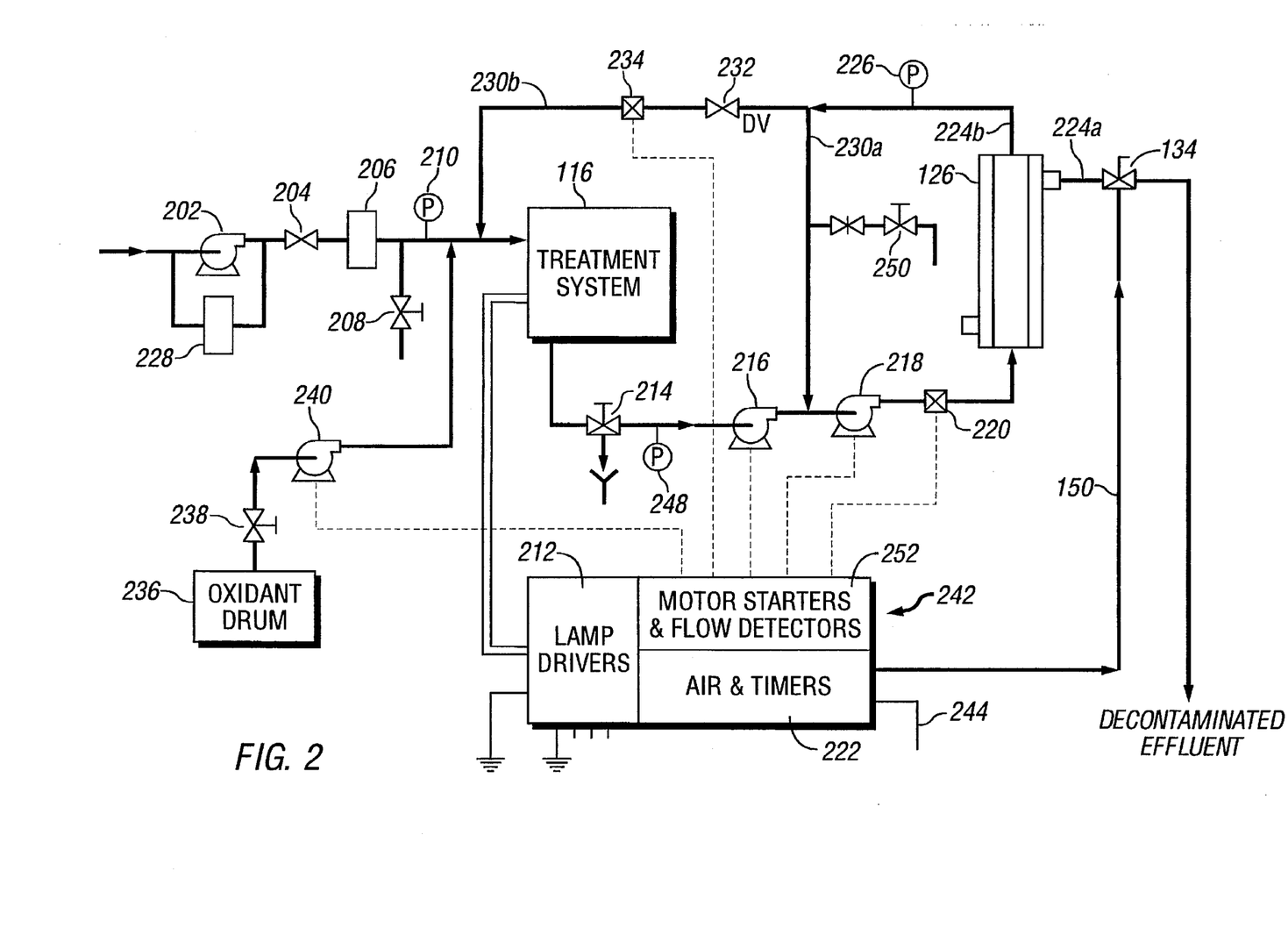
FIG. 2 is a process flow diagram of a continuous purification system, in accordance with another preferred embodiment of the present invention.

Referring to FIG. 2, a process flow diagram of a continuous purification system, in accordance with another preferred embodiment of the present invention, is illustrated. Pump 202 is operable to draw contaminated fluid from whatever source, through check valve 204, through filter 206, through pressure gauge 210, and onto treatment system 116. Path 230b also leads to treatment system 116. Flow path 230b supplies treatment system 116 with photoreactive catalyst that derives from filter unit 126. Photocatalytic treatment system 116 is operable to decontaminate the contaminated fluid that is supplied by pump 202.

Photocatalytic treatment system 116 passes the decontaminated effluent and catalyst to booster pump 216. Drain 214 and pressure gauge 248 are interposed between treatment system 116 and booster pump 216. Booster pump 216 is operable to increase the pressure that is being applied to the decontaminated effluent and catalyst deriving from treatment system 116. Booster pump 216 passes such decontaminated effluent and catalyst to recirculation pump 218. Recirculation pump 218 is operable to pass the decontaminated effluent and catalyst onto filter unit 126 at a sufficient velocity. Filter unit 126 is operable to segregate the decontaminated effluent from the catalyst. Filter unit 126 passes segregated decontaminated effluent through outlet 224a, whereas slurry retentate is passed through outlet 224b. Decontaminated effluent further passes through valve 134.

For filter unit 126 to operate most effectively, a fluid at a high velocity must be passed therethrough. In order to achieve such high volume through filter unit 126 a substantial amount of the slurry retentate that is passed through outlet 224b flows in accordance with flow path 230a so as to be drawn by recirculation pump 218 and passed onto filter unit 126. Slurry retentate that is emitted through outlet 224b and not drawn down flow path 230a, flows in accordance with flow path 230b and onto treatment system 116. Preferably, between 80% and 90% of slurry retentate flows in accordance with flow path 230a whereas 10% to 20% percent of the slurry retentate flows in accordance with flow path 230b. As such, filter unit 126 is provided with sufficient volume so as to effectively segregate decontaminated effluent from the photoreactive catalyst.

Slurry retentate that flows in accordance with flow path 230b flows through a control valve 232 as well as flow detector 234. Slurry retentate that flows in accordance with flow path 230a can be replaced with fully charged catalyst through the operation of charging port 250.

Container 236 contains an oxidant, such as oxygen, air, and hydrogen peroxide. Oxidants are passed from container 236 onto pump 240 through the control of valve 238. Oxidant pump 240 is operable to pass the oxidant onto treatment system 116 in order to enhance the photocatalytic reaction conducted by treatment system 116.

Electrical control unit is denoted by reference numeral 242. Power is supplied to electrical control unit by connection 244. Oxidant pump 240, booster pump 216, and recirculation pump 218 are started and controlled by motor starters, whereas flow detectors 234 and 220 are monitored by flow detector monitors. The motor starters and flow detector monitors are part of electrical control unit 252 and are denoted by reference numeral 252. Electrical control unit 242 further includes an air supply and timers as indicated by reference numeral 222. Air supply and timers 222 are operable to provide a high pressure air pulse to filter unit 126, through the control of valve 134, in order to remove any photoreactive catalyst collections from filter unit 126. Such back pulse is delivered through conduit 150. Electrical control unit 242 further includes lamp drivers 212. Lamp drivers 212 are operable to provide treatment system 116 with ultraviolet light of sufficient intensity, and for sufficient duration.

In order for filter unit 126 to operate effectively a substantial velocity through filter unit 126 must be achieved. Hence, a substantial volume of decontaminated effluent and catalyst must be passed through filter unit 126. Conventional systems have increased the size of treatment systems and filter units in order to accommodate a flow rate that would provide such a substantial velocity and volume. Further, conventional systems provide a valve at the outlet end of a filter unit in order to establish sufficient transmembrane pressure in the filter unit. This results in a significant energy loss. The present invention does not require such a modification—it maintains the necessary velocity and volume through filter unit 126, at a necessary transmembrane pressure, without oversizing treatment system 116 or filter unit 126, or incurring energy losses because of a valve situated at the outlet of the filter unit. The present invention does so by returning slurry retentate back through filter unit 126.

Booster pump 216 functions to increase the pressure head of the decontaminated effluent. The decontaminated effluent, along with slurry retentate that flows in accordance with flow path 230a, is forwarded onto filter unit 126 by circulation pump 218. Since preferably 80% to 90% of the slurry retentate is returned through feedback path 230a, a substantial volume is continuously passed through filter unit 126. The maintenance of an appropriate speed and volume is controlled and monitored by electrical control unit 242. As a consequence, only a minimal amount of slurry retentate is preferably returned to treatment system 116. As such, treatment system 116 need not be oversized in order to accommodate the return of all slurry retentate. That is, the filtrate flow rate through the treatment system is significantly less than the membrane flow rate through filter unit 126. By not requiring the filtrate flow rate to be equal to the membrane flow rate, channeling effects in treatment system 116 are avoided since only minimal amounts of catalyst are passed therethrough.

Further, the present invention can compensate for the collection of catalytic particles in filter unit 126 by controlling the amount of slurry retentate that is returned to treatment system 116. Still further, the placement of valve 232 along flow path 230b, only a minimal amount of the slurry retentate is passed therethrough. This results in minimal energy loss when compared to conventional systems which place a valve at the outlet of a filter unit and thus pass all slurry retentate through such conventional valve.

Feed pump 202 is preferably regulated through by-pass regulator 228 in order to match the feed stream with the discharge performance of filter unit 126. By-pass regulator 228 is provided, with associated conduits, in parallel alignment with pump 202. Such an alignment allows pump 202 to circulate fluid through by-pass regulator 228 and its associated conduit in order to match the flow of filter unit 126. That is, by-pass regulator 228 functions to equate the flow through feed pump 202 with that of filter unit 126. The use of by-pass regulator 228 thus eliminates the need for buffer tanks and/or accumulators, or additional process control. By-pass regulator 228 is upstream of the flow of slurry retentate and therefore avoids the problem of abrasion.

Treatment System

Conventional photocatalytic treatment systems and reactors for fluids, including those utilized for the treatment of air and water, suffer from the problem of channeling. Channeling can be defined as a volume or path in a treatment system in which the contaminant cannot be treated by the photocatalytic process. This typically occurs due to the inability for a photon of light to reach a catalytic particle. Channeling also occurs when there is not a sufficient amount of catalyst so that light passes through the contaminated fluid or is adsorbed by the fluid.

Figure 3A:
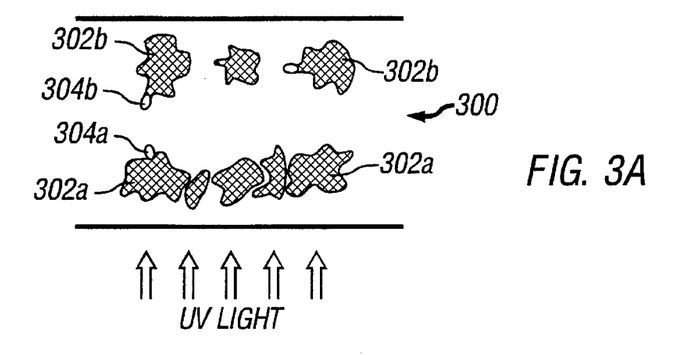
FIG. 3A illustrates a region wherein a photocatalytic reaction occurs, in accordance with conventional methods.

Referring to FIG. 3A, a photocatalytic region, in accordance with conventional methods, is illustrated. Photocatalytic region 300 contains catalytic particles 302 and contaminant molecules 304. When catalytic particles 302b and contaminant molecules 304b are displaced away from ultraviolet light source, and in back of a frontal layer of catalytic particles 302a, contaminant molecule 304b is not subjected to photocatalysis since no light is able to penetrate through frontal layer of catalytic particles 302a. In contrast, contaminant molecule 304a is subjected to photocatalysis because of its proximity with the ultraviolet light and catalytic particles 302a. Contaminant molecule 304b therefore flows through the outer portion of region 300 freely, or in other terms, it "channels" through region 300 without being subjected to photocatalysis.

Further, a photocatalytic process requires both rotational and translational movement of the catalytic particles for maximum efficiency. It also requires translational movement of the contaminant molecules for optimal transfer between the catalytic particle and contaminant molecule. However, as region 300 increases, rotational and translational movements of catalytic particles 302a and contaminant molecules decreases.

In order to optimize the process, the photocatalytic region is preferably reduced. As a consequence, less channeling will occur and efficiency will be increased dramatically. Preferably, only one complete layer of catalytic particles 302 is exposed to the ultraviolet light. Thus, all light will be readily adsorbed by the exposed catalytic particles 302. Catalytic particles 302 do not necessarily have to occupy the same plane. Rather, catalytic particles 302 can be randomly spaced at various distances from the ultraviolet light so long as they collectively capture substantially all the light.

Figure 3B:
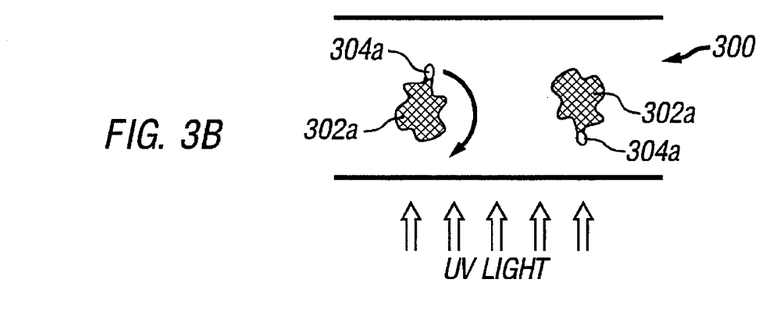
FIG. 3B illustrates a region wherein a photocatalytic reaction occurs, in accordance with a preferred embodiment of the present invention.

Referring to FIG. 3B, a photocatalytic region, in accordance with a preferred embodiment of the present invention, is illustrated. By decreasing photocatalytic region 300, only a single layer of catalytic particles 302a is exposed to ultraviolet light. By decreasing region 300, a shearing force becomes more significant. Such shearing force will create necessary turbulence so as to provide for the rotational movement of catalytic particle 302a and contaminant molecule 304a, as depicted in FIG. 3B. In other words, by decreasing the distance across the path that the slurry travels when it is subjected to irradiation, increased rotational movement and an increased reaction rate can be achieved.

Treatment system 116 preferably includes one or more photocatalytic cells or weirs. Each such cell possesses an annulus that is defined by the space between parallel or concentrical plates wherein a slurry is passed.

Figure 4:
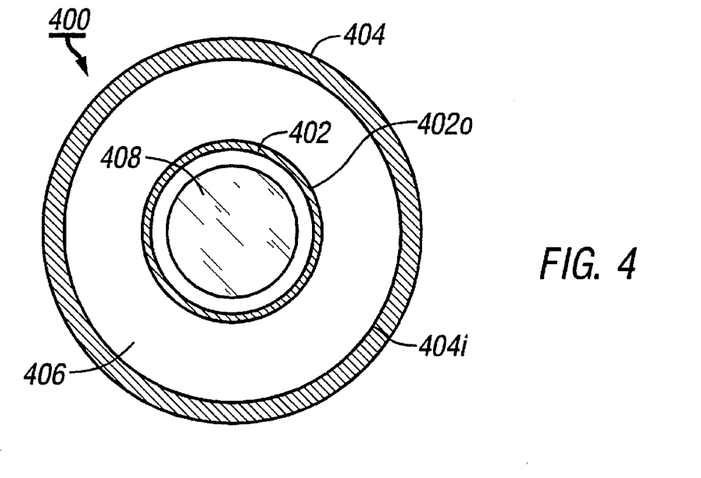
FIG. 4 illustrates a sectional view of a photocatalytic reactor cell, in accordance with a preferred embodiment of the present invention.

Referring to FIG. 4, a sectional view of a photocatalytic cell, in accordance with a preferred embodiment of the present invention, is illustrated. Photocatalytic cell 400 includes tube 402 which is concentrically disposed within tubing 404. The outer surface of tube 402 is denoted by reference numeral 402o whereas tubing 404 has an inner surface denoted by reference numeral 404i. The space formed between concentrical surfaces 402o and 404i is referred to as the annulus. The annulus is denoted by reference numeral 406.

Figure 5:
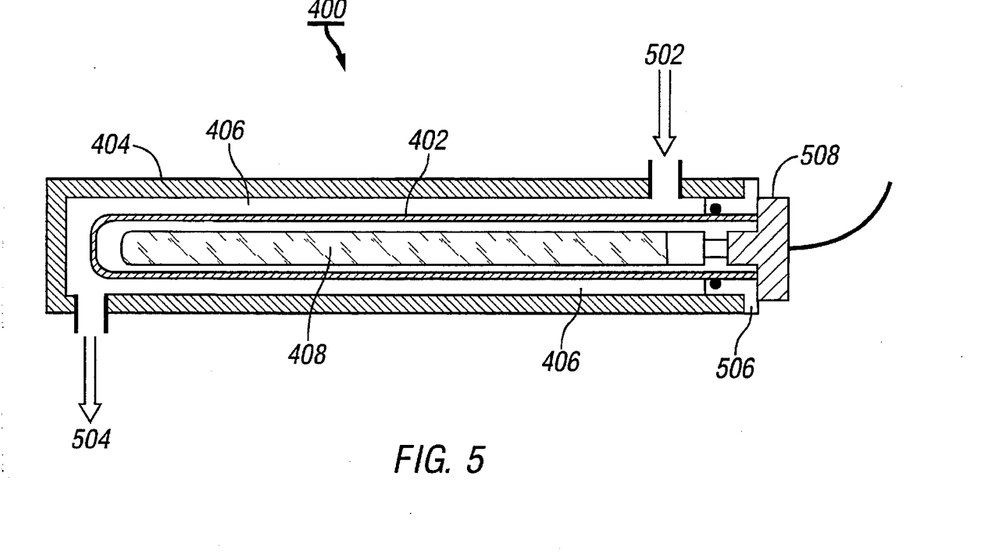
FIG. 5 illustrates a cross-sectional view of a photocatalytic reactor cell, in accordance with a preferred embodiment of the present invention.

Referring to FIG. 5, a cross-sectional view of a photocatalytic cell, in accordance with a preferred embodiment of the present invention, is illustrated. Photocatalytic cell 400 is preferably constructed of tubing 404. Tubing 404 is preferably composed of plastic, stainless steel, or another suitable material. Tubing 404 provides for inlet 502, as well as outlet 504.

Centrally disposed within tubing 404 is lamp 408. Lamp 408 is preferably an ultraviolet lamp, such as a G64T5L-type low pressure mercury ultraviolet lamp. Lamp 408 preferably emits ultraviolet light at a wavelength of 400 nm. or shorter when anatase $TiO_2$ is employed as a photoreactive catalyst. An ultraviolet wavelength of 254 nm. is especially preferred when anatase $TiO_2$ is employed as a photoreactive catalyst. Electronic ballasts (not illustrated) are utilized to increase the efficiency, power factor and life of lamp 408. The electronic ballasts serve to regulate the voltage supplied to the lamps. The efficacy of lamp 408, when operating on an electronic ballast, is substantially higher efficacy as when compared to the usage of a standard core-coil type ballast. The electronic ballasts may be controlled by programmable logic circuitry.

Surrounding lamp 408, and also centrally disposed in tubing 404, is transparent tube 402. Tube 402 is preferably composed of a material possessing a high transmissivity of light at the wavelengths emitted by lamp 408. For instance, tube 402 is preferably composed of quartz when wavelengths of 254 nm. are emitted by lamp 402, as is the preferred case when anatase $TiO_2$ is used as the photoreactive catalyst.

The area which is defined between the outer surface of tube 402 and the inner surface of tubing 404 is referred to as the annulus, and is denoted by reference numerals 406. Accordingly, decontaminated effluent and photoreactive catalyst enters photocatalytic cell 400 through inlet 502, passes through annulus 406 wherein it is irradiated by lamp 408, and exits photocatalytic cell 400 via outlet 504.

As described with reference to FIG. 3A, conventional reactors possess annuluses that are abundantly wide. As such, only those particles of catalyst that travel in close proximity to the light source are activated and subjected to the photocatalytic reaction. Those particles of catalyst that do not travel in close proximity to the light source are not, however, activated since the particles nearest to lamp absorb the energy emitted by the light source. In the present invention, annulus 406 is maintained as finite as the tolerance on tube 402 and tubing 404 allow. Thus, substantially all of the catalytic particles passing through photocatalytic cell 500 are activated by irradiation.

The width of annulus 406 is defined by the distance between surfaces 402o and 404i (as illustrated in FIG. 4). The width of annulus 406 is preferably equal to the diameter of the catalytic particle that is being utilized, in addition the size of the largest contaminant molecule to be treated.

When employing $TiO_2$ particles, having a surface area of 25 $m^2/g$ or greater, annulus 406 preferably has a width of less than 1 mm. That is, ultraviolet light will travel no more than 1 mm. from lamp 408 source before reaching a contaminant molecule and catalytic particle. Annulus widths of 1 mm. or less are readily obtainable using commercial grade fabrication materials, such as steel, plastic and glass. However, the width of annulus 406 should be formulated as diminutive as commercial or industrial levels allow. By providing for an annulus width of minimal size, the turbulence caused by photocatalytic cell 400 is increased due to shear stress for fluid flow between annulus 406. The turbulence caused by the shear stresses keeps the $TiO_2$ particles fully suspended. In turn, greater mass transfer is achieved. Turbulence in annulus 406 may be further increased or generated at lower flow rates by surfaces 402o and 404i (as illustrated in FIG. 4), which form annulus 406 by the threading or texturing of surfaces 402o and 404i. The texturing of surfaces 402o and 404i can be achieved by various conventional techniques, such as acid rinsing, the application of dies, and the like.

The existence of shear stress on the closely spaced surfaces 402o and 404i ensures complete turbulent flow through annulus 406, and thus total mixing of a slurry. In turn, mass transfer (i.e., increased adsorption of contaminants to catalytic particles) and the reaction rate are increased. In order to achieve turbulent flow of a slurry through annulus 406, the preferred turbulent boundary layer thickness is one-half of the width of annulus 406. Accordingly, the turbulent boundary layer from surfaces 402o and 404i will come in contact with one another. Successful decontamination requires a catalytic particle to come in contact with a photon and for contaminant molecule to be in the proximity of the excited catalytic particle. The addition of catalytic particles, in excess of what is required to mask out a single surface, will increase the probability that a catalytic particle will come within close proximity of a contaminant particle. However, the amount of catalyst that is not exposed to light will increase proportionally. As a consequence, the net reaction rate will go down and channeling will occur. In contrast, by providing less catalytic particles than necessary to mask out a single surface, photons will escape and the reaction rate will decrease. As a result, portions of the slurry will have to be treated again.

A constant mass or quantity of catalytic particles is thus preferably passed through annulus 406, at a given time. In other words, a constant charge of photoreactive catalyst is maintained. Such catalytic mass or quantity is preferably equal to the surface area is illuminated, multiplied by the thickness of the catalytic particles. The illuminated surface area is preferably equivalent to that of surface 404i.

When treatments system 116 is applied to treat air, catalytic particles may be suspended in the annulus, or fixed to the outer surface of the annulus. Although rotational velocity of the catalyst is lost since no air-born contaminant can get behind the fixed catalyst, channeling effects will be eliminated.

Filter Unit

Conventional back flushing techniques typically require a stoppage of between 45 and 90 seconds. In contrast, ceramic membranes can be cleansed in less than 1 second. The use of a ceramic membrane also provides several other advantages over conventional polymer membranes, namely, ceramic membranes (i) are not subject to chemical attack by organic solvents, (ii) are capable of sustaining a high pressure transmembrane pressure without reducing the lifetime of the membrane, (iii) do not fail due to harmonic effects or vibrations, such as those resulting from various pumps, (iv) do not require the usage of decontaminated effluent in order to clean the membrane (rather a gas can be used), (v) are capable of withstanding elevated temperatures and pressures, as well as all pH ranges, (vi) are not prone to deep lodging of catalytic particles, (vii) are not prone to yielding or stretching, and, (viii) can be sterilized without utilizing a chemical process.

Since polymeric membranes fail due to stretching from cyclic fatigue and pressure spikes, polymeric membranes are back flushed to remove collections of catalyst therein. Back flushing is a time consuming process which prohibits a continuous flow, and calls for the undesirable use of centrifugal pumps, accumulators and buffer tanks, as well as other equipment that adds to the complexity of a system.

Back flushing, also referred to counter-current unclogging, is primarily utilized for the removal of catalyst that has built up in a membrane. Back flushing causes the flow of decontaminated fluid, that has permeated through the polymeric membrane and collected in a storage tank, to be reversed through the membrane by a mild reversal of the pressure gradient across the membrane. Typically, between 10% and 20% of all permeate must be sent through a polymeric membrane for adequate back flushing to occur. The reversal of the pressure gradient is done slowly over time. The pressure gradient is normally 5 psi, but it is ordinarily never in excess of 25 psi, since polymeric membranes cannot sustain higher pressures. Because of the time required to backflush a polymeric membrane, it can only be performed on an infrequent basis. As a result, significant deposits of catalytic particles continue to collect in the polymeric membrane between instances of back flushing. Consequently, permeate flow through the membrane is reduced, and a constant charge of catalyst cannot be achieved.

In the present invention, filter unit 126 is preferably composed of a ceramic material. High pressure air can be instantaneously applied to a ceramic membrane to create a "shock wave" on the surface of the ceramic membrane since ceramic membranes can sustain back transmembrane pressures as high as 1,500 psi without resulting failure.

Figure 6:
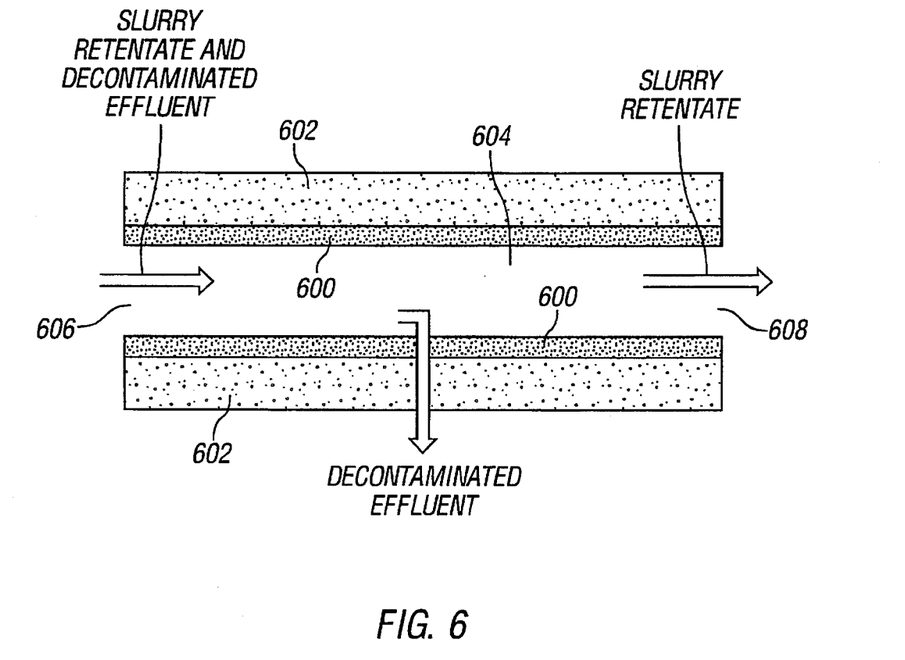
FIG. 6 illustrates a cross-sectional view of a ceramic membrane, in accordance with a preferred embodiment of the present invention.

Referring to FIG. 6, a ceramic membrane, in accordance with a preferred embodiment of the present invention is illustrated. Cylindrical ceramic membrane 600 is surrounded by ceramic support 602. Decontaminated effluent and slurry retentate flow through membrane channel 604 after entering ceramic membrane 600 via membrane inlet 606. Slurry retentate exits ceramic membrane 600 via membrane outlet at 608. In contrast, decontaminated effluent permeates through ceramic membrane 600 and continues to flow through ceramic support 602 until reaching an external collection point.

The diffusion of decontaminated effluent through ceramic membrane 600 is a factor of the pressure applied through ceramic membrane 600, which is commonly referred to as transmembrane pressure. Preferably, in normal operation, the transmembrane pressure is at least 10 psi when anatase $TiO_2$ is employed as a photoreactive catalyst. The pore diameters of ceramic membrane 600 also determine the permeation through ceramic membrane 600. Preferably, the pore diameters of ceramic membrane 600 are 10 microns or smaller when anatase $TiO_2$ is employed as a photoreactive catalyst.

Ceramic support 602 must be highly permeable and very strong. Preferably, ceramic support 602 is composed of alpha alumina. Ceramic support 602 preferably has an average pore diameter of 12 μm, and a channel diameter of between 4 mm. to 7 min. Ceramic membrane 600 is preferably composed of one or more layers of porous ceramic having a well defined texture. Ceramic membrane 600 can be composed of multiple layers of porous ceramic material. Preferably, the layer with the finest porosity forms the free surface of ceramic membrane 600, and thus performs the separation of decontaminated effluent. The layers which form the membrane are bonded in a monolithic way to one another, as well as to ceramic support 602, by sintering. Ceramic membrane 600 is preferably composed of alpha alumina material having a high corrosion resistance. Ceramic membrane 600 should also preferably have an average pore size of 0.2 μm. Ceramic membrane 600 should also be characterized by a chemical resistance to all chemicals except higher concentrations of $H_3PO_4$ and HF.

Figure 7:
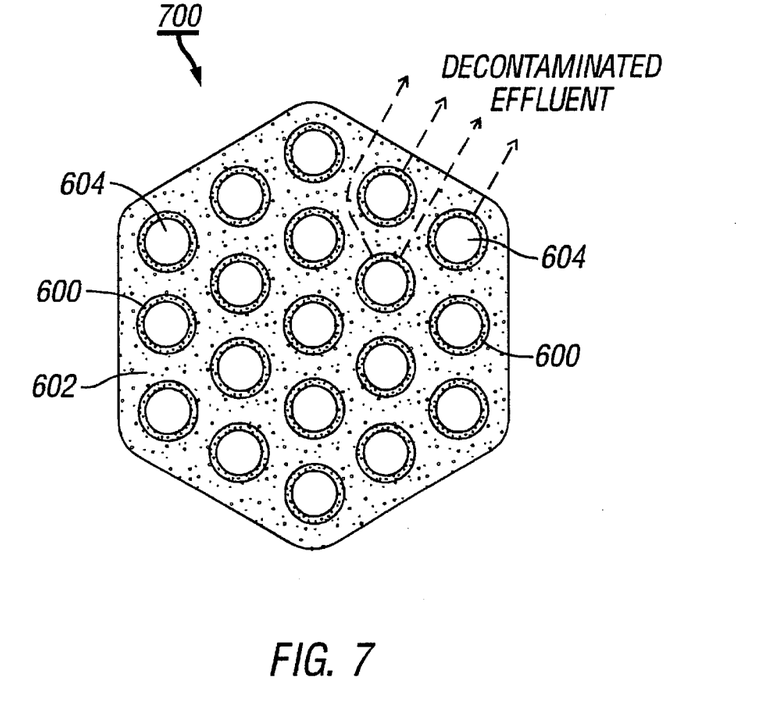
FIG. 7 illustrates a sectional view of an assembly of ceramic membranes, in accordance with a preferred embodiment of the present invention.

Referring to FIG. 7, an assembly of ceramic membranes, in accordance with a preferred embodiment of the present invention, is illustrated. Assembly 700 employs more than one ceramic membrane 600. Ceramic membranes 600 are disposed parallel to one another, within ceramic support 602, so as to form assembly 700. Decontaminated effluent flows in channels 604 along ceramic membranes 600, through ceramic membranes 600, and finally through ceramic support 602, before reaching an external point. Due to the very high permeability of ceramic support 602, the head loss caused by the flow of decontaminated effluent through ceramic support 602 is negligible. Several assemblies 700, as illustrated in FIG. 7, may be employed to form filter unit 126 (as illustrated in FIGS. 1 and 2).

Catalytic particles can become deposited in ceramic membrane 600, and can even form layers therein. Instantaneously applying a highly pressured gas or fluid to ceramic membrane 600 and into membrane channel 604 drives such catalyst deposits away from the inner wall of ceramic membrane 600. This allows for the filtration through ceramic membrane 600 to return to normal.

Preferably, a pressure gradient of 150 psi is applied to membranes 600 so as to create an instantaneous transmembrane pressure of 120 psi. The result is the application of a shock wave to membranes 600. The pulse should be less than one second in duration, and preferably less than 0.5 of a second. Only the decontaminated effluent that is within the ceramic membrane is sent back through the membrane, i.e., no storage reservoir is maintained. The total permeate sent through each membrane 600 is 0.5 liters for each square meter of membrane. For example, when a five minute interval between shock waves is utilized, less than 1/300 or 0.3% of the permeate is sent through membrane 600. As a result of a shock wave, a hammering effect is applied to the exposed surface of membranes 400 so that catalytic particles are released therefrom. Preferably, the shock wave should be applied at five minute intervals during continuous operation.

Referring back to FIG. 2, three-way valve 134 is employed to supply a shock wave to filter unit 126. When valve 134 is in its normal position, decontaminated fluid is emitted from filter unit 126 at outlet 224a, and passed through valve 134, before being recovered. When valve 134 is rapidly switched to its other position, the flow of decontaminated effluent through valve 134 is terminated and no further decontaminated effluent is recovered. Rather, high pressured air is passed via conduit 150, through valve 134, and onto filter unit 126. Thereafter, valve 134 is returned to its normal position so that decontaminated effluent can be recovered. Accordingly, three-way valve 134 is preferably operable to switch from its normal position to its other position, and back to its normal position, in less than 0.5 of a second.

Figure 8:
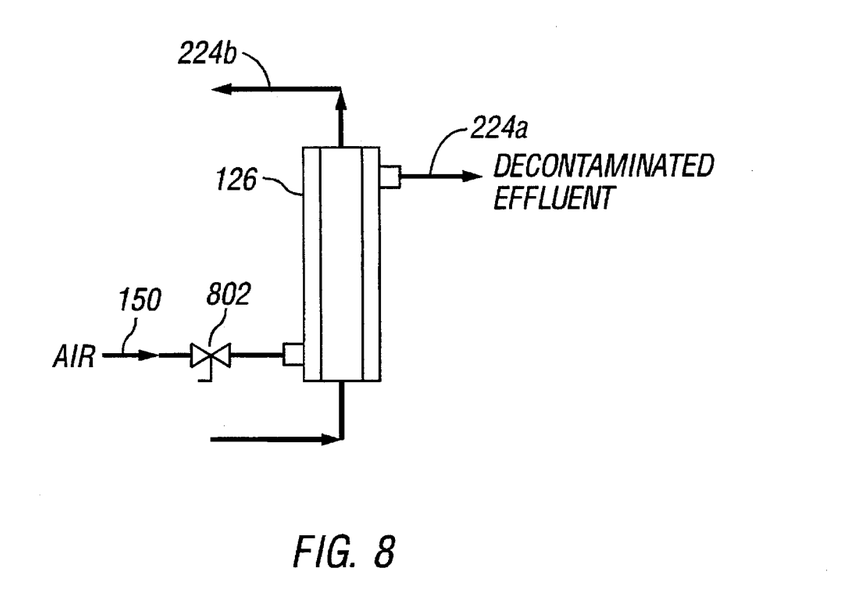
FIG. 8 illustrates an alternative embodiment for applying a shock wave through a filter unit, in accordance with a preferred embodiment of the present invention.

Alternatively, air may be employed to apply a shock wave to filter unit 126 as illustrated in FIG. 8. Referring to FIG. 8, two-way valve 802 is disposed opposite outlet 224a. Normally, valve 802 is in a closed position. When a back pulse is to be applied to filter unit 126, valve 802 is switched to its open position. High pressure air is then delivered through passed via conduit 150, through valve 802, and onto filter unit 126. Accordingly, two-way valve 802 is preferably operable to switch from its closed position to its open position, and back to its closed position, in less than 0.5 of a second.

Filter unit 126 may be sterilized by subjecting membranes 600 to high temperatures by passing steam therethrough, or by any other chemical free sterilization technique.

Removal of Metal From Contaminated Fluids

Contaminated fluids can contain metals which plate onto the catalytic particles. When this occurs, the effectiveness of the catalyst becomes significantly reduced over time. Various metals contained in a contaminated fluid, such as chromium, are not desirable even at low levels of detection.

Metals can be periodically removed from the catalyst by changing the pH of the slurry, as well as other known chemical processes for the removal of metal from a catalyst. Filter unit 126 (as illustrated in FIGS. 1 and 2), when composed of ceramic materials, is able to accept a wide variety of organic contaminants, as well as strong acids, bases, and other chemicals that are added periodically to the system for removing metals from the catalyst. Conventional polymeric membranes are, however, unable to do so.

Referring back to FIG. 2, chemicals, such as acids, can be added to flow path 230a in order to remove metals from catalytic particles. For example, a pump can be placed along flow path 230a in order to add acid to the slurry retentate that flows in accordance with flow path 230a. This provides sufficient time and agitation to sufficiently separate the metals from the catalytic particles. The removed metals are thereafter passed through ceramic filter unit 126. Ceramic filter unit 126 is operable to separate the metals, along with the decontaminated fluid, from the slurry retentate. The metals and decontaminated effluent are passed through outlet 224. If metal contamination is not desired to be combined with the decontaminated effluent, then the permeate stream passing through outlet 224a must be intermittently collected for further treatment.

Figure 9:
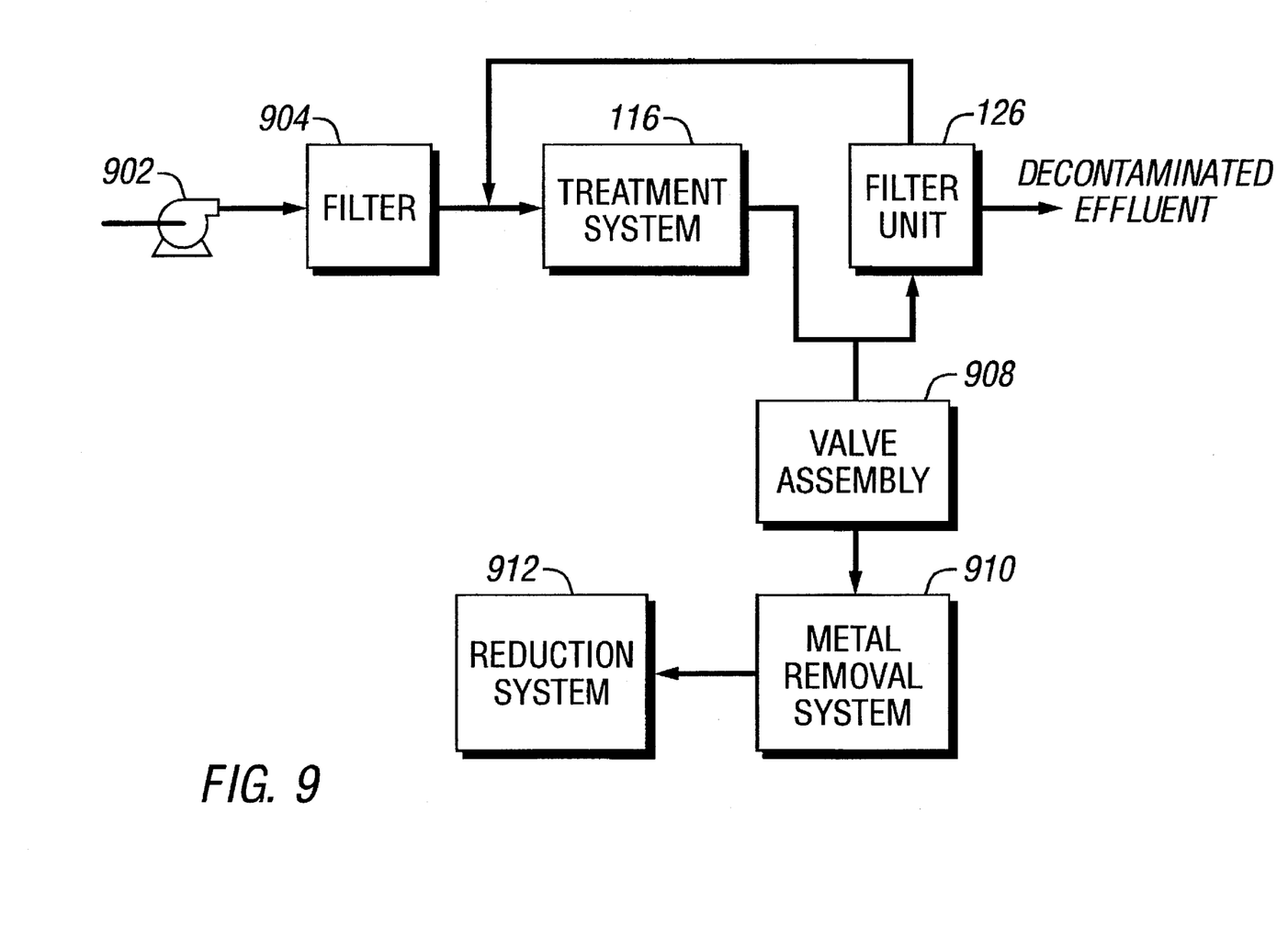
FIG. 9 illustrates a system for removing contaminants and metals from a contaminated fluid, in accordance with a preferred embodiment of the present invention.
Figure 10:
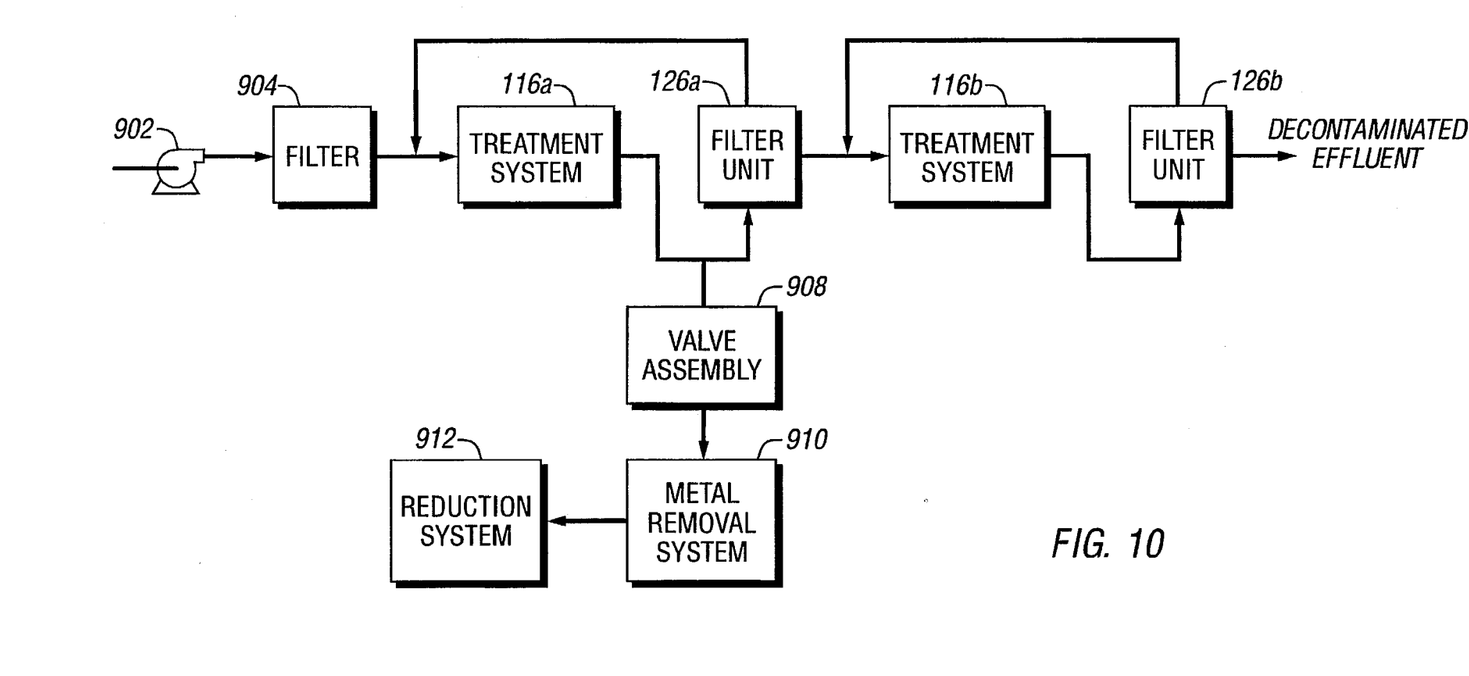
FIG. 10 illustrates a system for removing contaminants and metals from a contaminated fluid, in accordance with another preferred embodiment of the present invention.
Figure 11:
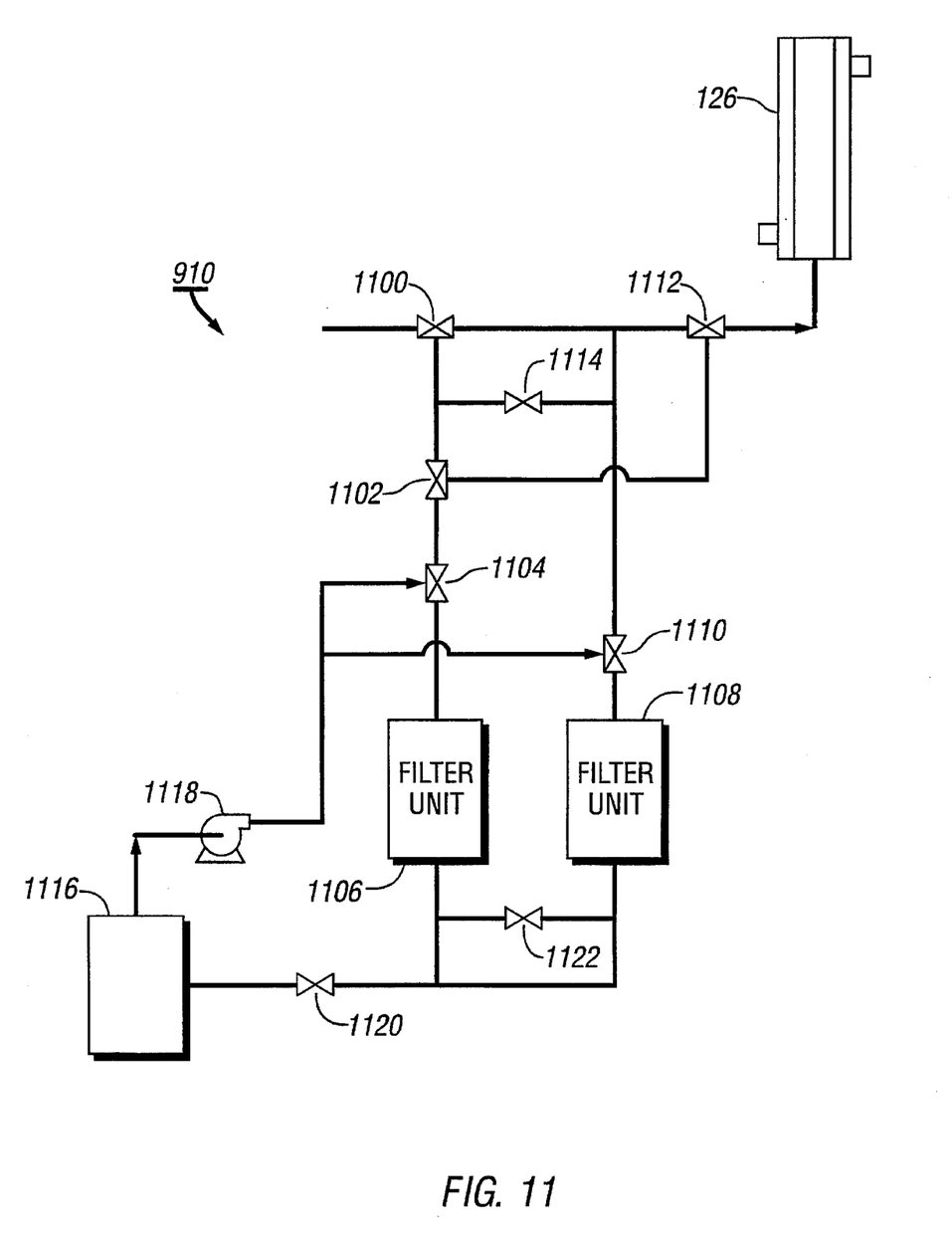
FIG. 11 illustrates a metal removal system, in accordance with a preferred embodiment of the present invention.

Metals can also be removed from a contaminated fluid as illustrated in FIGS. 9–11.

Referring to FIG. 9, a system for removing contaminants and metals from a contaminated fluid, in accordance with a preferred embodiment of the present invention, is illustrated. Pump 902 passes contaminated fluid past filter 904 and onto treatment system 116. Filter 904 is operable to remove any suspended solids from the contaminated fluid. Treatment system 116 is operable to remove metals from the contaminated fluid, as well as remove any contaminants from the contaminated fluid. The metals that are removed from the contaminated fluid are deposited onto the catalyst. Thereafter, the slurry is passed through filter unit 126 which is operable to separate the decontaminated effluent from the slurry, and return the slurry retentate to treatment system 116.

As more metals are deposited onto a catalyst particle, the efficiency of the catalyst particle in removing contaminants is decreased. Accordingly, as metal concentrations of the contaminated fluid increase, the catalyst must be "cleansed" of the metals deposited thereon on a more frequent basis.

As illustrated in FIG. 9, valve assembly 908 is operable to remove a portion of slurry (containing catalyst particles with metals deposited thereon) to metal removal system 910, as well as add "cleansed" slurry for use in conjunction with treatment system 116 (slurry possessing catalyst with metal deposits already removed). Further, a reduction system, as denoted by reference numeral 912, may also be employed to reduce the volume of metal laden effluent from a slurry.

Referring to FIG. 10, a system for the removal of metals, in accordance with another preferred embodiment of the present invention, is illustrated. In the system illustrated in FIG. 10, metals are first removed from a contaminated fluid, and then contaminants are removed from the contaminated fluid in a subsequent process. That is, a slurry is first passed through treatment system 116a wherein substantially all of the metals are removed from the contaminated fluid and deposited on the catalytic particles associated with treatment system 116a. Metal removal system 910 can then remove the deposited metals from the catalytic particles. Thereafter, the contaminated fluid, in the absence of metals, is passed to treatment system 116b. Treatment system 116b is operable to remove any further contaminant from the contaminated effluent. A decontaminated effluent is thereafter recovered after passing the slurry through filter unit 126b.

By employing the system illustrated in FIG. 10, the overall efficiency of this system in removing contaminants from the contaminated fluid is significantly increased since treatment system 116b operates in association with catalytic particles having no metals deposited thereon.

It should be noted that metal removal system 910 may also be disposed between filter unit 126 and 126a (of FIGS. 9 and 10, respectively) and treatment system 116 and 116a (of FIGS. 9 and 10, respectively) for the treatment of slurry retentate.

Referring to FIG. 11, a metal removal system, in accordance with a preferred embodiment of the present invention, is illustrated. FIG. 11 illustrates metal removal system 910. Valve 1100 is operable to alternatively pass slurry to filter unit 1106 and filter unit 1108. At other times, valve 1100 passes slurry to filter unit 126 or 126a (of FIGS. 9 and 10, respectively), via valve 1112.

When valve 1100 is set to pass slurry to filter unit 1106, valve 1114 is closed. Slurry deriving from treatment system 116 (of FIG. 9) or treatment system 116b (of FIG. 10) passes through valve 1100, through valve 1102, through valve 1104, and finally onto filter unit 1106. This occurs since valves 1120 and 1122 are closed and open, respectively. Filter unit 1106 is operable to separate fluid from the catalytic particles. That is, the catalytic particles with metal deposits thereon are entrained in unit 1106. The effluent deriving from filter unit 1106 then flows counter-current through filter unit 1108 so as to collect any catalytic particles that are entrained in filter 1108 which have already had metal deposits removed therefrom. This cleansed "slurry" then passes through valve 1110, and through valve 1112, and finally onto filter unit 126. Valve 1100 is then switched to its other position so that slurry deriving from treatment systems 116 (of FIG. 9) or 116b (of FIG. 10) is passed through valve 1100, through valve 1112, and onto filter unit 126.

Thereafter, valves 1120 and 1122 are open and closed respectively. Container 1116 contains a chemical solution for removing of metal deposits from catalytic particles. The chemical solution residing in container in 1116 is advanced by pump 1118 so as to travel through valve 1104, through filter unit 1106, and through valve 1120, before returning to container 1116. This serves to remove any metals from catalytic particles that have been entrained in filter unit 1106.

When valve 1100 is set to pass slurry to filter unit 1108, valve 1114 is open. Slurry derived from treatment systems 116 or 1002 is passed from valve 1100, through valve 1114, and through value 1110, and onto filter unit 1108. This occurs since valves 1120 and 1122 are closed and open, respectively. The effluent deriving from filter unit 1108 is then passed through valve 1122, and onto filter unit 1106. The effluent deriving from filter unit 1108 thus collects the catalytic particles residing in filter unit 1106 (which have already been cleansed of metals), and then passes through valve 1104, through valve 1102, and through valve 1112, before passing to filter unit 126.

The cleaning process is then performed on filter unit 1108, which contains the entrained catalytic particles having metals plated thereon. At such time, valve 1120 is opened and valve 1122 is closed. A chemical solution is passed from container 1116 through valve 1110, through filter unit 1108, and finally through valve 1120, before returning to container 1116.

Accordingly, filters 1106 and 1108 are utilized in alternating instances by the operation of valves. Such valves may be operated on a time dependent basis, or based on the detection of a predetermined concentration of metals deposited on the catalyst.

The method and system of the present invention, therefore, is well adapted to carry out the objects and attain the ends and advantages mentioned, as well as others inherent therein. While a presently preferred embodiment of the invention has been given for purposes of disclosure, numerous changes in the details of construction, o interconnection and arrangement of parts will readily suggest themselves to those skilled in the art, and which are encompassed within the spirit of the invention and the scope of the appended claims. For example, while annulus 406 has been illustrated (as in FIG. 4) as defining a space between concentrical surfaces, it may also be defined as a space between parallel surfaces.

Having thus described our invention, what is claimed is:

1. A method for purifying a contaminated fluid, comprising:

mixing a contaminated fluid with a photocatalyst to form a slurry;

passing the slurry through a space irradiated by ultraviolet light to bring about a photocatalytic reaction of the slurry whereby decontaminated effluents are rendered in the slurry;

segregating the decontaminated effluents from the slurry by filtration through a plurality of ceramic filter elements;

intermittently removing any collections of photocatalyst in the plural ceramic filter elements by passing a shock wave therethrough; and repeating the above steps with a substantially constant charge of photocatalyst.

2. The method according to claim 1, wherein:

the shock wave is generated by applying a pressure of at least 25 psi.

3. The method according to claim 1, further comprising:

detecting a magnitude of the contaminants in the slurry; and continuously repeating the method with a constant charge of photocatalyst until a selected level of contaminants is reached.

4. The method according to claim 1, wherein: the photocatalyst is $TiO_2$.

5. The method according to claim 1, wherein:

the photocatalyst is selected from the group consisting of $TiO_2$, $ZnO$, $CdS$, $CdSe$, $SnO_2$, $SvTiO_3$, $WO_3$, $Fe_2O_3$, and $Ta_2O_5$.

6. The method according to claim 1, wherein:

the distance across the irradiated space is substantially equal to the sum of a diameter of a photocatalyst particle and the diameter of a contaminant molecule.

7. The method according to claim 6, wherein:

the space induces the turbulent flow of slurry therebetween.

8. The method according to claim 7, wherein:

the surfaces that define the irradiated space are textured.

9. A method for the purification of fluid containing contaminant compounds, comprising:

mixing the fluid with anatase $TiO_2$ to form a slurry;

exposing the slurry to ultraviolet light through an irradiated annulus to effect an oxidation of the contaminant compounds, the oxidation providing a decontaminated effluent in the slurry;

passing the slurry through one or more ceramic membrane filters;

recovering the decontaminated effluent once it is segregated from the slurry; and removing collections of anatase $TiO_2$ from the plural ceramic membrane filters by applying a shock wave through the ceramic membrane filter(s).

10. The method according to claim 9, further comprising:

adding an oxidant to the slurry.

11. The method according to claim 10, wherein:

the oxidant is peroxide.

12. The method according to claim 10, wherein:

the oxidant is oxygen.

13. The method according to claim 10, wherein:

the oxidant is air.

14. A method for purifying a contaminated fluid, comprising:

mixing a contaminated fluid with anatase $TiO_2$ particles to form a slurry;

passing the slurry through an annulus that is exposed to an ultraviolet light source;

irradiating the slurry with the light source to effect a photocatalytic reaction;

supplying the irradiated slurry to one or more ceramic membrane filters to provide a retentate;

intermittently removing collections of $TiO_2$ particles from the ceramic membrane filter(s); and intermittently removing metals deposited on some of the $TiO_2$ particles present in the slurry.

15. The method according to claim 14, wherein:

the annulus is defined by a plurality of surfaces having a radial distance therebetween, the radial distance between the surfaces defining the annulus being approximately 1 mm or less.

16. The method according to claim 14, further comprising:

recirculating some of the retentate through the ceramic membrane filter(s).

17. The method according to claim 16, further comprising:

mixing the retentate not recirculated through the ceramic membrane filter(s) with a decontaminated fluid.

18. The method according to claim 16, wherein the step of intermittently removing metals from some of the $TiO_2$ particles present in the slurry includes:

isolating a portion of the slurry;

separating the $TiO_2$ particles from the slurry portion; and removing metal deposits from the separated $TiO_2$ particles by applying a chemical solution thereto.

19. The method according to claim 18, wherein:

the isolated portion of the slurry is replaced with a substantially equal portion of slurry having metal deposits already removed therefrom.

20. A method for purifying a contaminated fluid, comprising:

mixing the contaminated fluid with $TiO_2$ particles to form a slurry;

treating the slurry through photocatalysis by irradiating the slurry with ultraviolet light as it passes through an irradiated annulus so as to render a decontaminated effluent in the slurry;

separating the decontaminated fluid from the slurry by passing the slurry through one or more ceramic membrane filters;

periodically removing collections of $TiO_2$ particles from the plural ceramic membrane filter(s); and concurrently repeating the steps of treating of the slurry and separating the decontaminated effluent from the slurry to different portions of the slurry.

21. The method according to claim 20, wherein:

a substantially constant charge of $TiO_2$ particles are used in association with the method.

* * * * *